W. P. & S. G. THOMSON.
SPLICE BAR FOR RAILS.
APPLICATION FILED APR. 26, 1909.

1,009,026.

Patented Nov. 14, 1911.

2 SHEETS—SHEET 1.

WITNESSES
R. A. Balderson
G. L. Winters

INVENTORS
W. P. Thomson
S. G. Thomson
by Bakewell, Byrnes & Parmelee
their Attys.

W. P. & S. G. THOMSON.
SPLICE BAR FOR RAILS.
APPLICATION FILED APR. 26, 1909.

1,009,026.

Patented Nov. 14, 1911.

2 SHEETS—SHEET 2.

WITNESSES
R A Balderson
Jesse B. Heller

INVENTORS
Wm P. Thomson
S. G. Thomson,
by Bakewell, Byrnes & Parmelee,
their Attys

UNITED STATES PATENT OFFICE.

WILLIAM P. THOMSON AND SAMUEL G. THOMSON, OF PHILADELPHIA, PENNSYLVANIA, ASSIGNORS TO THOMSON-THOMSON COMPANY, OF PHILADELPHIA, PENNSYLVANIA, A PARTNERSHIP.

SPLICE-BAR FOR RAILS.

1,009,026.   Specification of Letters Patent.   Patented Nov. 14, 1911.

Original application filed May 23, 1907, Serial No. 375,339. Divided and this application filed April 26, 1909. Serial No. 492,343.

*To all whom it may concern:*

Be it known that we, WILLIAM P. THOMSON and SAMUEL G. THOMSON, both of Philadelphia, in the county of Philadelphia and State of Pennsylvania, have invented a new and useful Improvement in Splice-Bars for Rails, of which the following is a full, clear, and exact description, reference being had to the accompanying drawings, forming part of this specification, in which—

Figure 5:
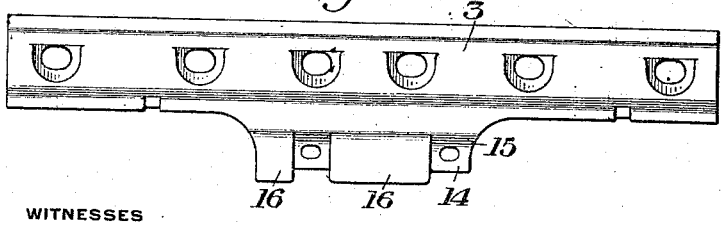
Figure 6:
Figure 7:
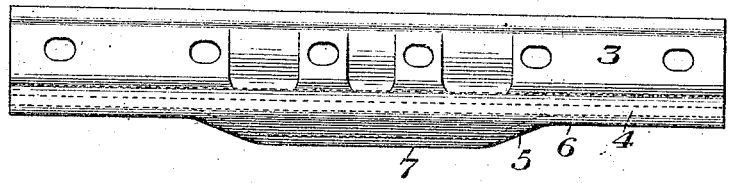
Figure 8:
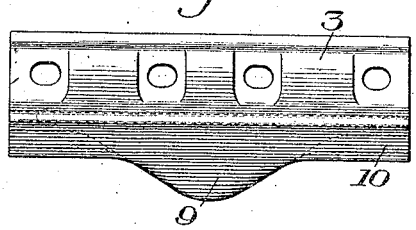
Figure 9:
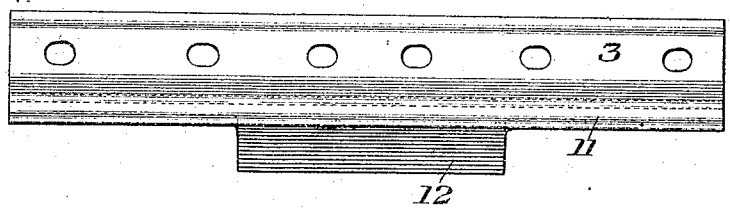
Figure 10:
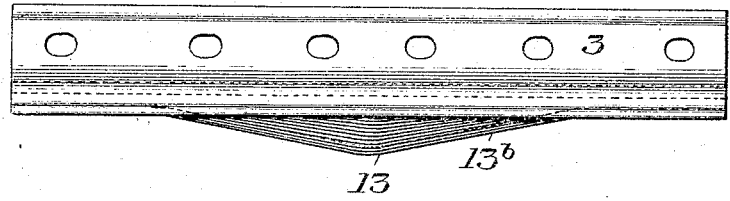

Figures 1, 2, 3 and 4 are sectional views illustrating different embodiments of our invention; Fig. 5 is a side view of one form of bar embodying our invention; Fig. 6 is an end view of the bar shown in Fig. 5; and Figs. 7, 8, 9 and 10 are side views respectively of the splice bars shown in Figs. 1, 2, 3 and 4.

Our invention has relation to splice bars for rail joints, the present application being a division of our pending application, Serial No. 375,339, filed May 23, 1907.

The present invention relates to the class of splice bars which have a portion extending below and beneath the rails, and is designed to provide a bar of this type having a deep reinforcing section or portion of a novel and efficient character.

We are aware of the fact that heretofore splice bars have been proposed having deep reinforcing sections of various characters, but in none of them has there been such a location of the deepest portion of this reinforcing section as to cause it to extend obliquely inward from a point adjacent to the outer edge of the rail base to its point of greatest depth, which is the essential feature of our invention. We have found from experience and extended physical tests, that there are two important reasons for so locating any deep section lying between the ties. The first and most important reason is that a line extending obliquely inward from the outer edge of the rail base represents the resultant of forces transmitted around the edge of the rail base to the portion of the splice bar below the rail base. The proper location of this inwardly extending reinforcing member is at an angle of about forty-five degrees to the horizontal, since a flange or gusset located at about that angle will have its least tendency under load to move either toward the horizontal or toward the vertical, and therefore, the maximum stiffness due to its extreme depth will be secured in this location without the necessity of designing any other portion of the bar to resist a tendency of the deep section to move either inwardly or outwardly. This deep section may be joined by gussets to the end portions of the splice bar, bearing underneath the rail base; and in such cases, the oblique form of the deep section may be made to approach nearer the horizontal or nearer to the vertical than would be correct if the deep section were severed entirely from the end portions which seat the rail bases. It is essential, however, in any case, that the obliquely located deep section shall join the upper portion of the bar at a point so close to the outer edge of the rail base that the leverage between the top of the deep section below the rail base and the bottom of the foot portion passing around the outer edge of the rail base shall be very short, so that the strains in passing from the foot portion of the bar above the rail base to the deep section below the rail base will have to travel a very short distance in a horizontal direction before being diverted naturally to the deep section. Previous attempts at similar reinforcements beneath the rail base have involved the use of such a long horizontal portion to join the foot member of the bar above the rail base to the deep section below the rail base, that the value of the deep section is destroyed to a large extent. This is because the efficiency of the deep section merely acts in such instances to bend the horizontal section out of contact with the bottom of rail base with such force as to push the foot portion above the rail base upward and outward. We have found that the only location of a deep section which will efficiently resist load stresses passing around the outer edge of the rail base is an oblique location somewhere between the vertical and horizontal. Such a location not only causes the strains to pass naturally in the direction of the deep section, but the correct result is secured with a minimum amount of metal. The second essential reason for this location of the deep section is that it interferes to the least possible extent with tamping beneath the rail ties.

In the accompanying drawing, we have shown a number of different embodiments of our invention which will now be described, it being premised, however, that these are illustrative only and that our invention is applicable to other forms of bars than those which are here shown and described.

In these drawings, the numeral 2 wherever seen designates a T-rail, and 3 the upper portion of a splice bar fitting between the head and base flanges of the rails. The upper portions of these bars may be of various forms or sections, as shown in Figs. 1, 2, 3 and 4, with the web portion either vertical or inclined.

Figure 1:
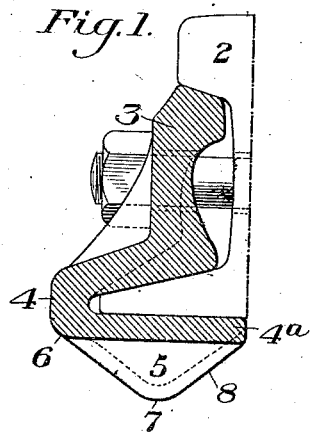

In the form of our invention shown in Fig. 1, the bar has a portion 4, extending around the outer edge of the base of the rail and underneath such base to form a horizontal seat or support therefor. The inwardly extending horizontal portion of this bar has one or more downward displacements 5, which constitute the deep reinforcing sections of our invention. It will be noted that this displacement or downwardly extending deep section commences at the point 6, as close as possible to the outer edge of the rail base, and that it extends obliquely inward and downward to the point 7, which is the deepest portion of the section. The inner edge 8 of the deep section is also shown as extending obliquely upward to the inner edge of the base portion 4ª of the bar.

Figure 2:
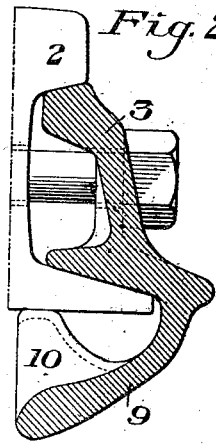

In the form of the invention shown in Fig. 2, the bar has a depending member 9, which extends obliquely inward underneath the rail base with an upward displacement 10, which is brought into contact with the under side of the rail base to form a support therefor. There may be one or more of these displacements in the length of the bar, and the inwardly and downwardly extending flanges 9 constitute the deep reinforcing sections of our invention, which sections, as in Fig. 1, extend obliquely inward and downward from a point adjacent to the outer edge of the rail base to the deepest portion of the section, which is approximately underneath the center of the rail.

Figure 3:
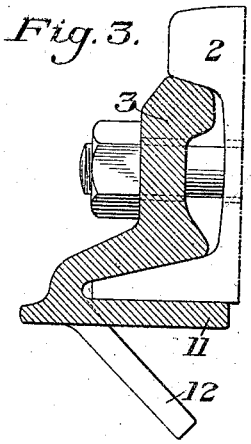

Fig. 3 shows a bar having a base portion 11, extending underneath and forming a seat for the base of the rail in the same manner as in Fig. 1, but in this form, the deep reinforcing section is formed by cutting off or slitting up a section or tongue 12, which is bent obliquely downward and inward. This deep reinforcing section 12 is separated entirely at its edges from the base 11, being united to such base at a point adjacent to the outer edge of the rail base.

Figure 4:
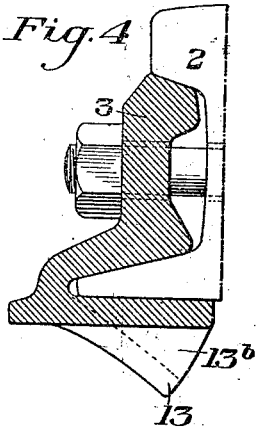

In the form shown in Fig. 4, the bar is substantially the same as in Fig. 3, but the deep reinforcing section 13 is forced up, displacing a portion, preferably the central portion of the base, downwardly out of contact with the rail base. This displaced portion may be cut away from the portions which remain in contact with the rail base, as in Fig. 3, or it may be connected thereto by gussets 13ᵇ, as shown. This deep reinforcing section is, in general, similar to that shown in Fig. 1, but its deepest point is more nearly underneath the central portion of the rail base than is the deepest portion of the section shown in Fig. 1.

Figs. 5 and 6 show respectively in side and end elevation another modification of the bar, in which the central portion of the bar is provided with a member 14, depending below the rail base and having portions thereof displaced upwardly and inwardly, as shown at 15, to form seats for the bases of the rails; the remaining portions 16, extending obliquely downward and inward from a point adjacent to the outer edge of the rail base to their free inner edges to form deep reinforcing sections.

It will be obvious from the modifications shown and described, that the invention can be readily applied to other forms of bars than those shown, the essential feature in all cases, however, being the oblique disposition or location or the deep reinforcing section. In other words, we believe that we are the first to so locate the deep section in relation to the rail-bearing end sections that the gussets joining them to the rail-bearing end sections are not required to keep the deep section from kicking outward under load. In fact, these gussets may be cut away without decreasing to any material extent the full efficiency of the deep sections. These gussets in our structure are mainly designed to make the vertical resistance of the splice bar greater at the point where the deep section or sections join the rail bearing sections than would be the case if the portions between the deep section or sections and the rail-bearing sections were sheared away.

We claim:

1. A splice bar for rails, having portions to extend under and form seats for the rail bases and a central portion at the mid-section of the bar, located at a distance from the rail bases for the entire width of said central portion and forming a deep section extending downwardly and inwardly from the outer edges of the rail bases to the lowermost portion of the bar.

2. A splice bar for rails, lying entirely on one side of the rails and having a member below the rail bases, said member forming seats at the ends of the bar to contact with the bottom faces of the rail bases and also forming a deep section at its middle, said deep section slanting inwardly at an angle to the horizontal from a point adjacent to the outer edges of the rail bases and being joined by gussets to the end portions.

3. A rail joint, having similar splice bars on each side of the rails, each of said bars having a member to extend under and form seats for the rail bases, the central portion of each of said members forming a deep section slanting inwardly at an angle to the horizontal to the lowest point of said central portion from a point adjacent to the outer edges of the rail bases.

4. A splice bar for rails, having a foot member to contact along its entire length with the tops of the rail bases and a lower member to extend inwardly below the rail bases, the portion of said lower member at the mid-section of the bar being forced downwardly for the greater portion of its width from the general alinement of the bar to form a deep reinforcement, said reinforcement lying entirely on one side of a vertical longitudinal plane through the middle of the rail webs and slanting inwardly at an angle to the horizontal from a point adjacent to the outer edges of the rail bases.

5. A splice bar for rails having a member extending inwardly below the rail bases the portion of said member at the mid-section of the bar forming the deepest portion of the bar, and the end portions of said member forming seats contacting with the under faces of the rail bases, said deepest portion lying entirely on one side of a vertical longitudinal plane through the middle of the rail webs and slanting inwardly at an angle to the horizontal from a point adjacent to the outer edges of the rail bases.

6. A splice bar for rails, provided with a member extending under and supporting the rail bases, said member having a portion thereof displaced downwardly to form a deep section which is joined to its horizontal end portions by skirts or gussets, said deep section extending downwardly below any other portion of the bar and lying entirely on one side of a vertical longitudinal plane bisecting the rails and slanting inwardly at an angle to the horizontal from a point adjacent to the outer edges of the rail bases.

7. A rail joint, having a splice bar on each side of the rails, each of said bars provided with a member extending under and supporting the rail bases, each of said members having a similar central portion thereof displaced downwardly to form a deep section which is joined to the horizontal end portions by skirts or gussets, said deep section slanting inwardly at an angle to the horizontal from a point adjacent to the outer edges of the rail bases and forming the lowest portion of the bar.

8. A rail joint having a splice bar on each side of the rails, each of said bars provided with a member extending under the bottom of the rail bases and forming a support therefor, said supporting members each having a central portion which is displaced downwardly to form a deep reinforcing section, the deepest portion of this reinforcing section lying entirely on one side of the vertical longitudinal plane bisecting the rails, and the outer edge of the reinforcement slanting inwardly at an angle to the horizontal from a point adjacent to the outer edges of the rail bases.

In testimony whereof, we have hereunto set our hands.

WILLIAM P. THOMSON.
SAMUEL G. THOMSON.

Witnesses:
M. M. HAMILTON,
McLEOD THOMSON.